United States Patent
Nasu (10) Patent No.: US 12,309,516 B2
(45) Date of Patent: May 20, 2025

(54) IMAGING APPARATUS HAVING MEMORY INCLUDING VOLTAGE HOLDING CIRCUITS

(71) Applicant: CANON KABUSHIKI KAISHA, Tokyo (JP)

(72) Inventor: Hitoshi Nasu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/056,956

(22) Filed: Nov. 18, 2022

(65) Prior Publication Data

US 2023/0164464 A1 May 25, 2023

(30) Foreign Application Priority Data

Nov. 24, 2021 (JP) .................. 2021-190619
Jul. 15, 2022 (JP) .................. 2022-113923

(51) Int. Cl.
*H04N 25/77* (2023.01)
*H04N 25/772* (2023.01)

(52) U.S. Cl.
CPC .................. *H04N 25/772* (2023.01)

(58) Field of Classification Search
CPC .................................................. H04N 25/772
See application file for complete search history.

(56) References Cited

U.S. PATENT DOCUMENTS

2016/0344966 A1* 11/2016 Tanaka ................. H04N 23/667
2022/0021833 A1* 1/2022 Berkovich ........... H04N 25/709
2023/0049844 A1* 2/2023 Lloyd ............... H01L 27/14612

FOREIGN PATENT DOCUMENTS

JP         2017220896 A      12/2017

* cited by examiner

*Primary Examiner* — Lin Ye
*Assistant Examiner* — Fayez A Bhuiyan
(74) *Attorney, Agent, or Firm* — Canon U.S.A., Inc. IP Division (57) ABSTRACT

An imaging apparatus includes a pixel and a memory. The pixel includes a photoelectric conversion circuit and a charge/voltage conversion circuit. The memory is arranged so as to correspond to the pixel on a one-on-one basis and includes a plurality of voltage holding circuits each configured to hold a voltage signal output from the pixel. The voltage holding circuits hold respective voltage signals in different accumulation periods in the pixel and the voltage holding circuits are connected in parallel. The voltage signals in the different accumulation periods are averaged into an averaged voltage signal.

6 Claims, 7 Drawing Sheets

IMAGING APPARATUS HAVING MEMORY INCLUDING VOLTAGE HOLDING CIRCUITS

BACKGROUND

Technical Field

One disclosed aspect of the embodiments relates to an imaging apparatus.

Description of the Related Art

In a complementary metal-oxide semiconductor (CMOS) sensor, a so-called global electronic shutter for equalizing signal charge accumulation periods among pixels in a plurality of rows has been proposed in late years. That is, each pixel includes a charge holding circuit that temporarily holds a signal charge, a photoelectric conversion circuit simultaneously accumulates signal charges for all pixels, and the signal charges are transferred to respective charge holding circuits, whereby the global electronic shutter is implemented.

An imaging apparatus discussed in Japanese Patent Application Laid-Open No. 2017-220896 transfers signal charges accumulated in a photoelectric conversion circuit in one frame to a plurality of charge holding circuits in a time-division manner, and thereby increases a saturation charge amount of the photoelectric conversion circuit.

However, in a configuration of Japanese Patent Application Laid-Open No. 2017-220896, because signals that correspond to respective time-divided signal charges of pixels and that are held in the respective charge holding circuits are sequentially read out, one-frame image data output from the imaging apparatus increases.

SUMMARY

One disclosed aspect of the embodiments has been made in consideration of the above situation, and provides an imaging apparatus capable of extending a dynamic range without increasing one-frame image data output from the imaging apparatus.

According to an aspect of the embodiments, an imaging apparatus includes a pixel and a memory. The pixel includes a photoelectric conversion circuit and a charge/voltage conversion circuit. The memory is arranged so as to correspond to the pixel on a one-on-one basis and includes a plurality of voltage holding circuits each configured to hold a voltage signal output from the pixel. The voltage holding circuits hold respective voltage signals in different accumulation periods in the pixel and the voltage holding circuits are connected in parallel. The voltage signals in the different accumulation periods are averaged into an averaged voltage signal.

Further features of the disclosure will become apparent from the following description of exemplary embodiments with reference to the attached drawings.

DESCRIPTION OF THE EMBODIMENTS

Preferred exemplary embodiments of the disclosure will be described in detail with reference to the accompanying drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Figure 1:
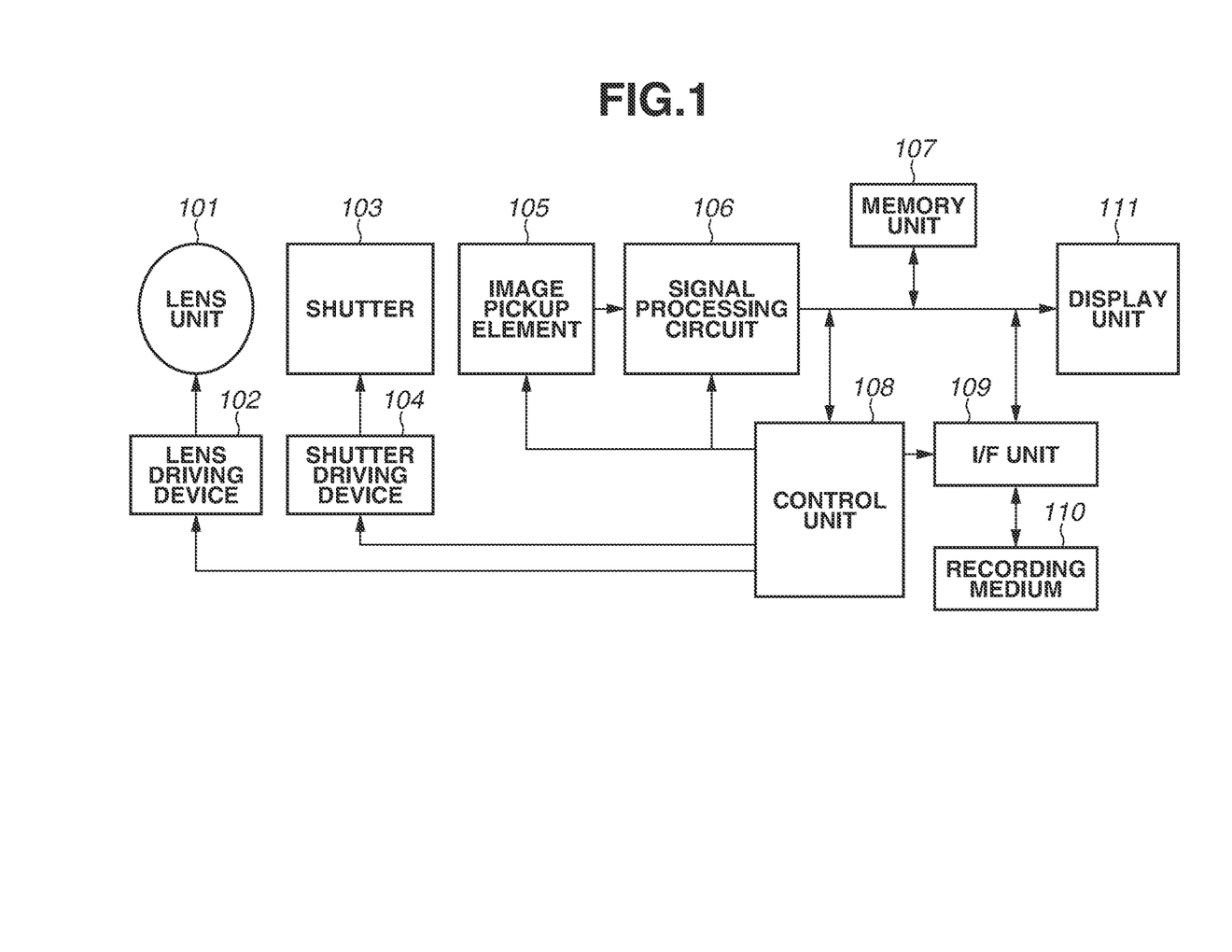
FIG. 1 is an overall block diagram illustrating an imaging apparatus.

A first exemplary embodiment is now to be described. FIG. 1 is a block diagram illustrating an example of an imaging system of a digital camera or the like according to the first exemplary embodiment of the disclosure. In FIG. 1, a lens unit or circuit 101 is driven by a lens driving device 102 to perform zoom control, focus control for forming an image from an optical image of an object on an image pickup element 105, diaphragm control, and the like. A mechanical shutter 103 is subjected to drive control performed by a shutter driving device 104. The image pickup element 105 photoelectrically converts an object image formed by the lens circuit 101 to import the object image as an image signal.

A signal processing circuit 106 performs digital gain processing of digitally increasing a gain of the image signal output from the image pickup element 105, various kinds of correction processing, data compression processing, and the like. The memory unit or circuit 107 temporarily stores image data. A control unit or circuit 108 controls the whole of the imaging apparatus and also performs various kinds of calculation processing. A recording medium 110 such as a semiconductor memory is detachable from the imaging system. An interface (I/F) unit or circuit 109 is a circuit for recording or reading out the image data in/from the recording medium 110. A display unit or circuit 111 displays various kinds of information, a captured image, and the like.

An operation to be performed when an image is captured in the above-mentioned imaging system is now to be described. When a main power source is turned ON, power is supplied to imaging system circuits such as the control circuit 108 and the signal processing circuit 106. When a release button, which is not illustrated, is pressed, an image-capturing operation is started. An image signal output from the image pickup element 105 is subjected to various kinds of correction and image processing in the signal processing circuit 106, and the corrected image data is written in the memory circuit 107 in response to an instruction from the control circuit 108.

The image data recorded in the memory circuit 107, under control of the control circuit 108, passes through the I/F circuit 109 and is recorded in the recording medium 110, and the image-capturing operation ends. The imaging system may be configured to directly input the captured image data to a computer or the like through an external I/F unit or circuit, which is not illustrated, and perform image processing.

Figure 2:
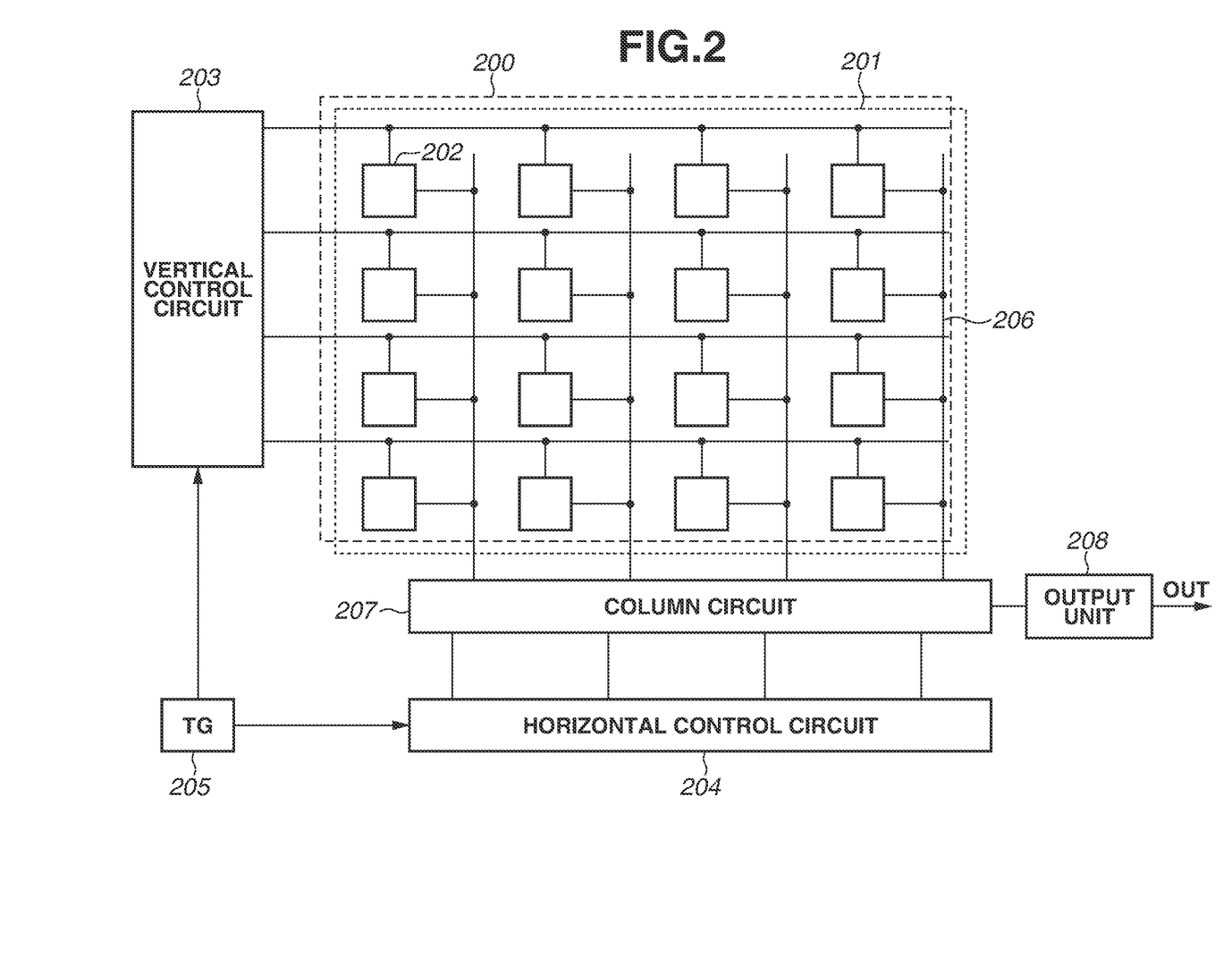
FIG. 2 is a block diagram illustrating an image pickup element.

FIG. 2 is a diagram illustrating a configuration example of the image pickup element according to the present exemplary embodiment. The image pickup element includes a pixel region 200, a memory unit or circuit 201, a vertical control circuit 203, a horizontal control circuit 204, a time generator (hereinafter referred to as TG) 205, a vertical transfer line 206, a column circuit 207, and an output unit or circuit 208.

A plurality of pixels 202 is arranged in a matrix in the pixel region 200. For simplification of the description, only 4×4 pixels 202 are illustrated in the pixel region 200, but many more pixels are arranged for practical applications. A plurality of memories corresponding to the respective pixels 202 in the pixel region 200 is arranged in the memory circuit 201. The plurality of memories will be described below. For example, the image pickup element may be configured so that the pixel region 200 is formed on a first semiconductor substrate, the memory circuit 201 is formed on a second semiconductor substrate that is different from the first semiconductor substrate, and the first semiconductor substrate and the second semiconductor substrate are stacked on each other.

The vertical control circuit 203 controls a pixel selection switch, which will be described below, to transfer a pixel signal from the pixel 202 to the memory circuit 201. The pixel signal held in the memory circuit 201 is transferred through the vertical transfer line 206 to the column circuit 207 and converted into a digital signal, and is output to the outside of the image pickup element through the output circuit 208. The TG 205 sends out a control signal for outputting a pixel signal from each pixel to the vertical control circuit 203 and the horizontal control circuit 204.

Figure 3:
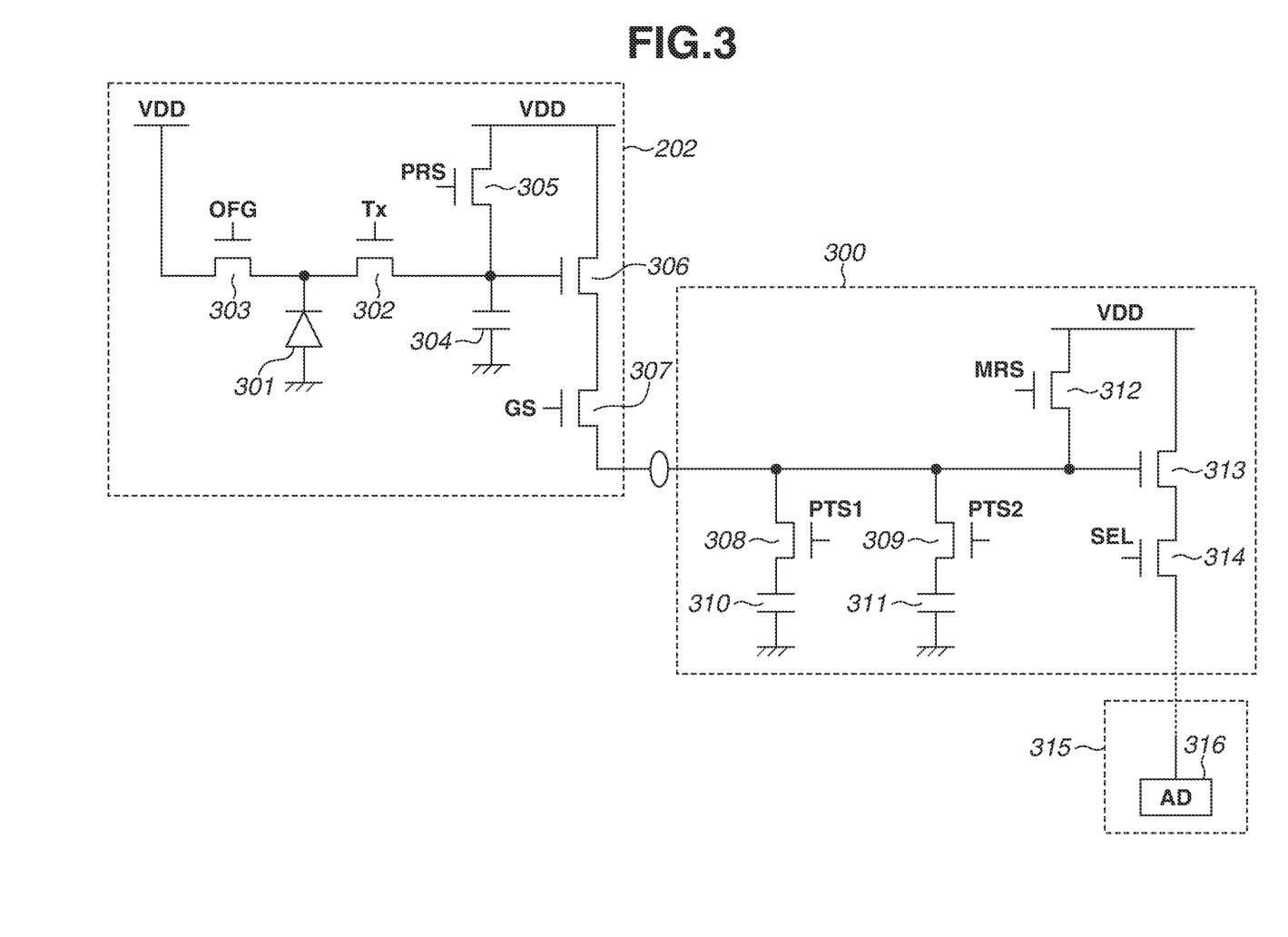
FIG. 3 is a circuit diagram illustrating a pixel, a memory section, and a column circuit according to a first exemplary embodiment.

FIG. 3 illustrates a memory 300 arranged so as to correspond to the pixel 202 on a one-to-one basis and a column circuit 315.

The pixel 202 includes a photodiode 301 serving as a photoelectric conversion unit or circuit, a transfer transistor 302, an overflow gate 303, a floating diffusion (hereinafter referred to as FD) 304 serving as a charge/voltage conversion unit or circuit, and a pixel reset transistor 305. The pixel 202 further includes a pixel amplification transistor 306, a current source for driving the pixel amplification transistor 306, and a pixel selection switch 307. The current source is not illustrated.

The memory 300 includes a first memory control switch 308, a second memory control switch 309, a first memory capacity (first voltage holding unit or circuit) 310, and a second memory capacity (second voltage holding unit or circuit) 311. The memory 300 further includes a memory reset transistor 312, a memory amplification transistor 313, and a row selection switch 314. The column circuit 315 includes an analog/digital (A/D) conversion unit or circuit 316.

The following signals are supplied to respective gates of the above-mentioned switch transistor. A signal Tx is supplied to the gate of the transfer transistor 302, a signal OFG is supplied to the gate of the overflow gate 303, a signal PRS is supplied to the gate of the pixel reset transistor 305, and a signal GS is supplied to the gate of the pixel selection switch 307. A signal PTS1 is supplied to the gate of the first memory control switch 308, a signal PTS2 is supplied to the gate of the second memory control switch 309, a signal MRS is supplied to the gate of the memory reset transistor 312, and a signal SEL is supplied to the gate of the row selection switch 314. Each element is electrically connected when a corresponding signal becomes high.

Figure 4:
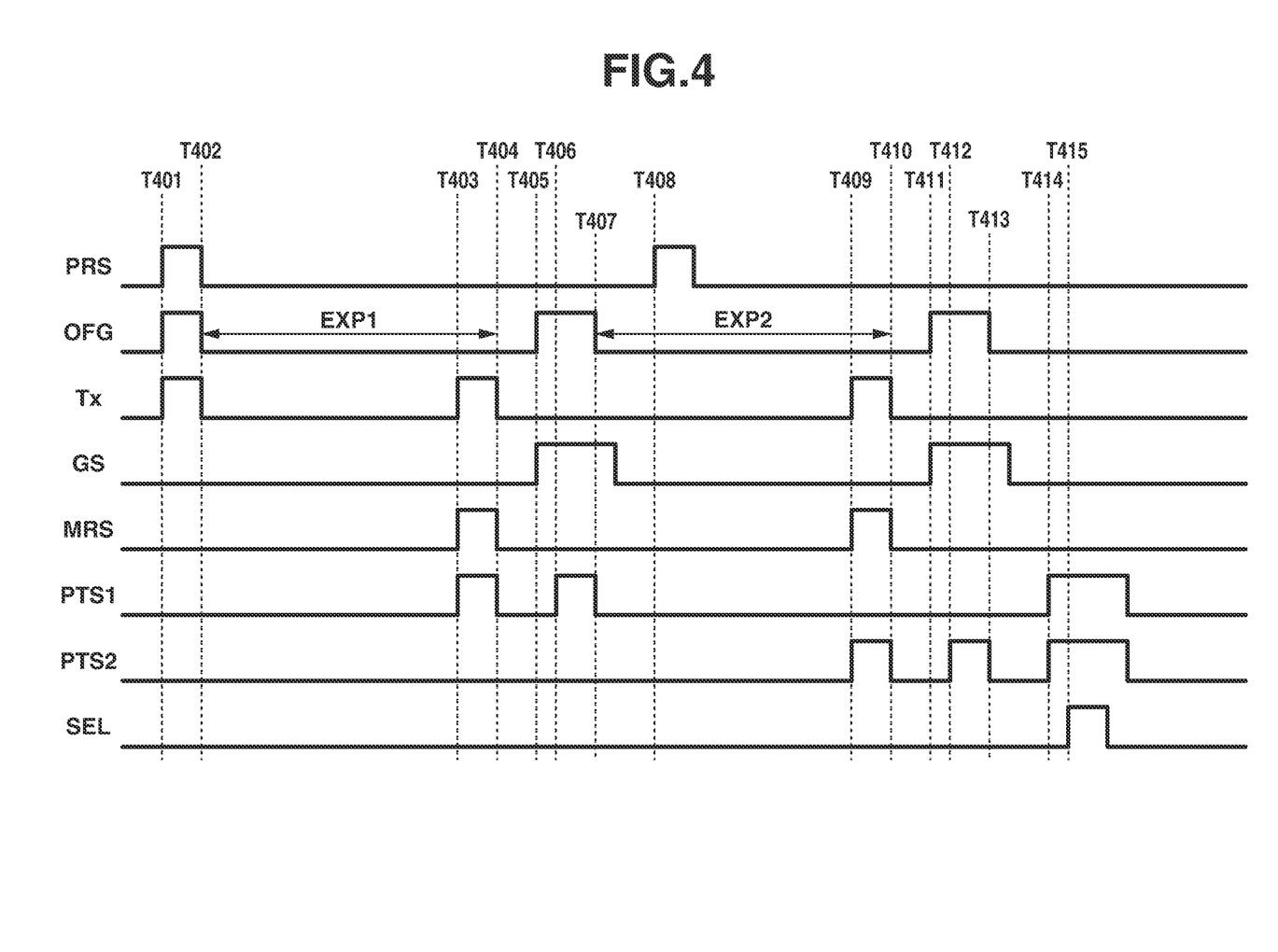
FIG. 4 is an operation timing chart according to the first exemplary embodiment.

FIG. 4 is a timing chart for one-frame operations for extending a dynamic range according to the first exemplary embodiment. Timings for operations in the pixels 202 in the entire rows are identical from a time T401 to a time T414, but timings for operations in the memory circuit 201 are different for each row at a time T415.

At the time T401, the signals PRS, OFG, and Tx become high, and the photodiode 301 and the FD 304 are reset.

At the time T402, the signals PRS, OFG, and Tx become low, reset of the photodiode 301 and the FD 304 is completed, and a first accumulation period EXP1 is started.

At the time T403, the signal Tx becomes high, and a signal charge accumulated in the photodiode 301 is transferred to the FD 304. At this time, the signals MRS and PTS1 become high, whereby the first memory capacity 310 is reset.

At the time T404, the signal Tx becomes low, the transfer of the signal charge accumulated in the photodiode 301 to the FD 304 is completed, and the first accumulation period EXP1 ends.

At the time T405, the signal GS in the pixel 202 in each of the entire rows becomes high, and the pixel selection switch 307 is electrically connected, whereby a voltage signal corresponding to the signal charge held in the FD 304 is amplified by the pixel amplification transistor 306 and collectively transferred to the memory 300.

At the time T406, the signal PTS1 becomes high, whereby the voltage signal in the first accumulation period EXP1 is held in the first memory capacity 310.

At the time T405, the signal OFG becomes high, whereby the photodiode 301 is reset. At the time T407, the signal OFG becomes low, whereby reset of the photodiode 301 is completed and a second accumulation period EXP2 is started.

At the time T408 in the second accumulation period EXP2, the signal PRS becomes high, and the FD 304 is reset.

At the time T409, the signal Tx becomes high, and the signal charge accumulated in the photodiode 301 is transferred to the FD 304. At this time, the signals MRS and PTS2 become high, whereby the second memory capacity 311 is reset.

At the time T410, the signal Tx becomes low, the transfer of the signal charge accumulated in the photodiode 301 to the FD 304 is completed, and the second accumulation period EXP2 ends.

At the time T411, the signal GS in the pixel 202 in each of the entire rows becomes high, and the pixel selection switch 307 is electrically connected, whereby a voltage signal corresponding to the signal charge held in the FD 304 is amplified by the pixel amplification transistor 306 and collectively transferred to the memory 300.

At the time T412, the signal PTS2 becomes high, whereby the voltage signal in the second accumulation period EXP2 is held in the second memory capacity 311.

At the time T411, the signal OFG becomes high, whereby the photodiode 301 is reset. At the time T413, the signal OFG becomes low, whereby reset of the photodiode 301 is completed.

At the time T414, the signals PTS1 and PTS2 simultaneously become high, and the first memory capacity 310 and the second memory capacity 311 are connected in parallel.

Connecting the first memory capacity 310 and the second memory capacity 311 in parallel averages the voltage signal corresponding to the first accumulation period EXP1 and held in the first memory capacity 310 and the voltage signal corresponding to the second accumulation period EXP2 and held in the second memory capacity 311.

Thereafter, at the time T415, which is different for each row, an averaged voltage signal of the voltage signal corresponding to the first accumulation period EXP1 and held by the first memory capacity 310 and the voltage signal corresponding to the second accumulation period EXP2 and held in the second memory capacity 311 is subjected to A/D conversion by the A/D conversion circuit 316 in the column circuit 315.

A period from the time T404 to the time T407 including a reset period of the photodiode 301 is a very short period as compared with the first accumulation period EXP1 and the second accumulation period EXP2. Hence, a non-accumulation signal is negligibly small, and the first accumulation period EXP1 and the second accumulation period EXP2 can be regarded as an approximately continuous accumulation period.

As described above, one-frame accumulation time is divided, and voltage signals corresponding to divided and accumulated signal charges are averaged, whereby a dynamic range that is determined by a saturation capacity of the photodiode can be extended. A dynamic range of the pixel amplification transistor determined by a power source voltage can also be extended.

Voltage signals obtained in divided one-frame accumulation time are held in the respective memory capacities, the memory capacities are connected in parallel before AD conversion, and the voltage signals are averaged, whereby processing can be performed on a signal whose dynamic range is extended without the need for a high power source voltage. In addition, an amount of data output from the AD conversion circuit is identical to that in a case where the accumulation time is not divided.

A signal from the FD 304 being reset during a period from the time T402 to the time T403 and during the accumulation period after reset cancellation at the time T408 until the time T409 (reset cancellation signal) may be obtained to increase a signal-to-noise (SN) ratio by a publicly-known correlated double sampling (CDS) operation.

With the above-described configuration, the imaging apparatus with a wide dynamic range can be provided without increasing an amount of one-frame image data output from the imaging apparatus.

In the first exemplary embodiment, the example of averaging only accumulation signals in each pixel has been described. In a second exemplary embodiment, a CDS operation is performed by averaging of also reset cancellation signals (non-accumulation signals) in each pixel.

Figure 5:
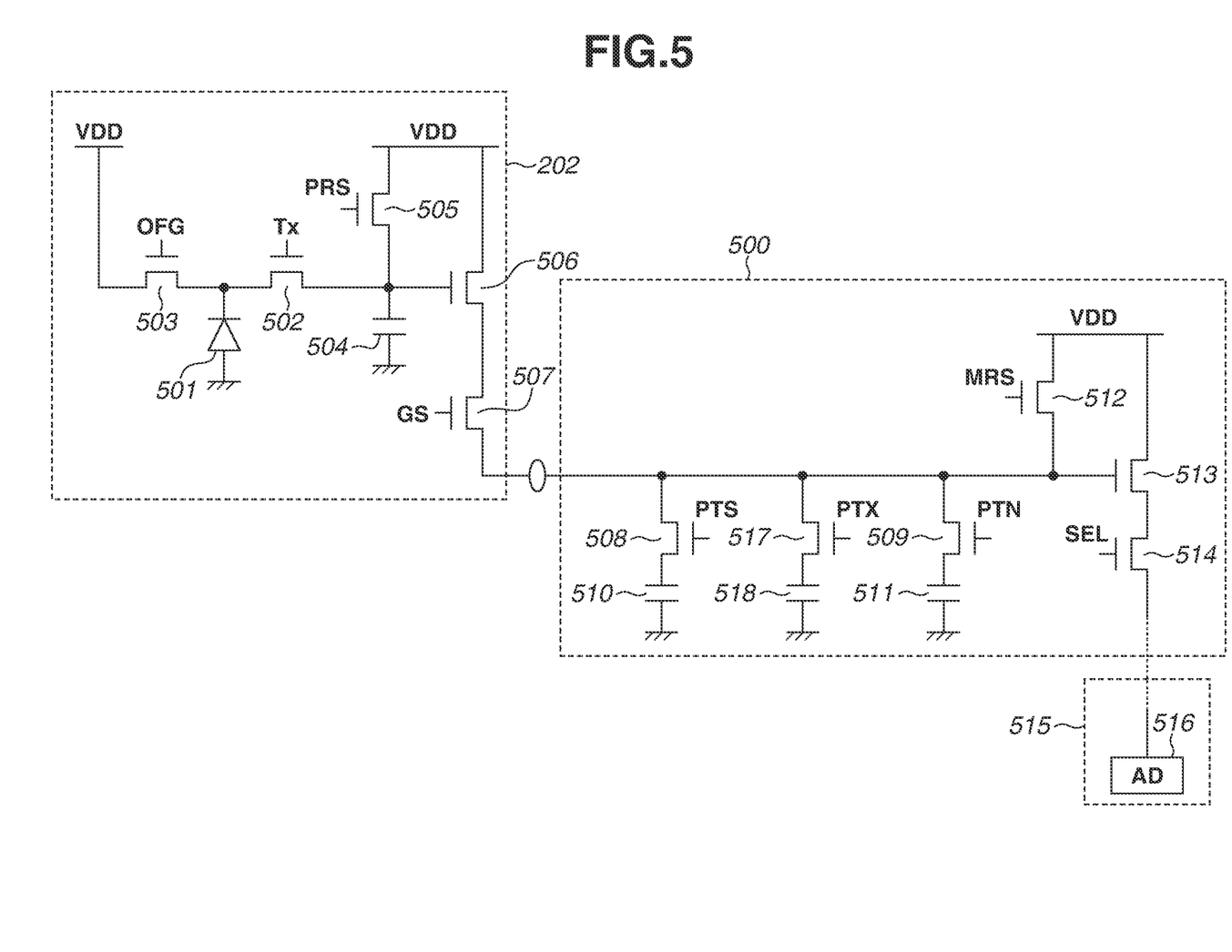
FIG. 5 is a circuit diagram illustrating a pixel, a memory section, and a column circuit according to a second exemplary embodiment.

FIG. 5 illustrates the pixel 202, a memory 500 arranged so as to correspond to the pixel 202 on a one-to-one basis, and a column circuit 515, according to the second exemplary embodiment of the disclosure.

A photodiode 501, a transfer transistor 502, an overflow gate 503, and an FD 504 are identical to the photodiode 301, the transfer transistor 302, the overflow gate 303, and the FD 304, respectively, in FIG. 3. A pixel reset transistor 505, a pixel amplification transistor 506, and a pixel selection switch 507 are identical to the pixel reset transistor 305, the pixel amplification transistor 306, and the pixel selection switch 307, respectively, in FIG. 3.

A first memory control switch 508, a second memory control switch 509, a first memory capacity 510, and a second memory capacity 511 are identical to the first memory control switch 308, the second memory control switch 309, the first memory capacity 310, and the second memory capacity 311, respectively, in FIG. 3. A memory reset transistor 512 and a memory amplification transistor 513 are identical to the memory reset transistor 312 and the memory amplification transistor 313, respectively, in FIG. 3.

A row selection switch 514 and an A/D conversion unit or circuit 516 are identical to the row selection switch 314 and the A/D conversion circuit 316, respectively, in FIG. 3.

In the second exemplary embodiment, a third memory control switch 517 and a third memory capacity 518 are added to the memory 500 in comparison with the configuration illustrated in FIG. 3. The second exemplary embodiment is different from the first exemplary embodiment in that a signal PTS is supplied to the first memory control switch 508, that a signal PTN is supplied to the second memory control switch 509, and that a signal PTX is supplied to the third memory control switch 517.

Figure 6:
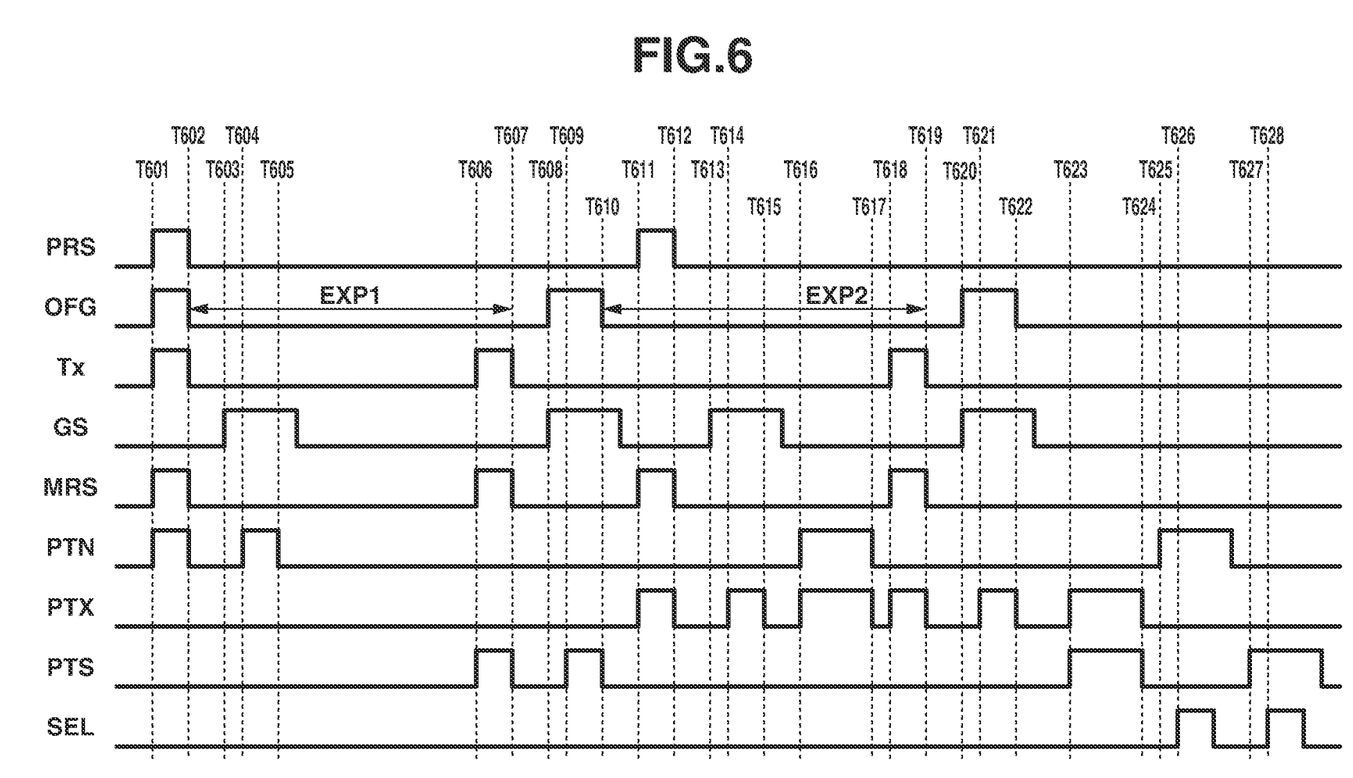
FIG. 6 an operation timing chart according to the second exemplary embodiment.

FIG. 6 is a timing chart for one-frame operations for extending the dynamic range according to the second exemplary embodiment. Timings for operations in the pixels 202 in the all rows are identical from a time T601 to a time T624, but timings for operations in the memory circuit 201 are different for each row at a time T625 or later.

At the time T601, the signals PRS, OFG, and Tx become high, and the photodiode 501 and the FD 504 are reset. At this time, the signals MRS and PTN become high, whereby the second memory capacity 511 is reset.

At the time T602, the signals PRS, OFG, and Tx become low, reset of the photodiode 501 and the FD 504 is completed, and the first accumulation period EXP1 is started.

At the time T603, the signal GS in the pixel 202 in each of the all rows becomes high, and the pixel selection switch 507 is electrically connected, whereby a first reset cancellation signal (non-accumulation signal) held in the FD 504 is amplified by the pixel amplification transistor 506 and transferred to the memory 500.

The signal PTN becomes high at the time T604 and becomes low at the time T605, whereby the first reset cancellation signal is held in the second memory capacity 511.

At the time T606, the signal Tx becomes high, whereby a signal charge accumulated in the photodiode 501 is transferred to the FD 504. At this time, the signals MRS and PTS become high, whereby the first memory capacity 510 is reset.

At the time T607, the signal Tx becomes low, the transfer of the signal charge accumulated in the photodiode 501 to the FD 504 is completed, and the first accumulation period EXP1 ends.

At the time T608, the signal GS in the pixels 202 in each of the all rows becomes high, and the pixel selection switch 507 is electrically connected, whereby a voltage signal corresponding to the signal charge held in the FD 504 is amplified by the pixel amplification transistor 506 and collectively transferred to the memory 500.

The signal PTS becomes high at the time T609 and becomes low at the time T610, whereby the voltage signal in the first accumulation period EXP1 is held in the first memory capacity 510.

At the time T608, the signal OFG becomes high, whereby the photodiode 501 is reset. At the time T610, the signal OFG becomes low, whereby reset of the photodiode 501 is completed and the second accumulation period EXP2 is started.

At the time T611 in the second accumulation period EXP2, the signal PRS becomes high, and the FD 504 is reset. The signals MRS and PTX also become high, whereby the third memory capacity 518 is reset.

At the time T613, the signal GS in the pixel 202 in each of the all rows becomes high, and the pixel selection switch 507 is electrically connected, whereby a voltage signal corresponding to the signal charge held in the FD 504 is amplified by the pixel amplification transistor 506 and collectively transferred to the memory 500.

The signal PTX becomes high at the time T614 and becomes low at the time T615, whereby a second reset cancellation signal is held in the third memory capacity 518.

The signals PTN and PTX simultaneously become high at the time T616 and simultaneously become low at the time T617, whereby the second memory capacity 511 and the third memory capacity 518 are connected in parallel.

As a result of connecting the second memory capacity 511 and the third memory capacity 518 in parallel, voltage signals of the first reset cancellation signal (first non-accumulation signal) held in the second memory capacity 511 and the second reset cancellation signal (second non-accumulation signal) held in the third memory capacity 518 are averaged.

At the time T618, the signal Tx becomes high, and a signal charge accumulated in the photodiode 501 is transferred to the FD 504. At this time, the signals MRS and PTX become high, whereby the third memory capacity 518 is reset.

At the time T619, the signal Tx becomes low, the transfer of the signal charge accumulated in the photodiode 501 to the FD 504 is completed, and the second accumulation period EXP2 ends.

At the time T620, the signal GS in the pixel 202 in each of the all rows becomes high, and the pixel selection switch 507 is electrically connected, whereby a voltage signal corresponding to the signal charge held in the FD 504 is amplified by the pixel amplification transistor 506 and collectively transferred to the memory 500.

The signal PTX becomes high at the time T621 and becomes low at the time T622, whereby a voltage signal in the second accumulation period EXP2 is held in the third memory capacity 518.

At the time T620, the signal OFG becomes high, whereby the photodiode 501 is reset. At the time T622, the signal OFG becomes low, whereby reset of the photodiode 501 is completed.

The signals PTS and PTX simultaneously become high at the time T623 and simultaneously become low at the time T624, whereby the first memory capacity 510 and the third memory capacity 518 are connected in parallel.

As a result of connecting the first memory capacity 510 and the third memory capacity 518 in parallel, the voltage signal corresponding to the first accumulation period EXP1 and held in the first memory capacity 510 and the voltage signal corresponding to the second accumulation period EXP2 and held in the third memory capacity 518 are averaged.

Thereafter, the signal PTN becomes high at the time T625, which is different for each row, and furthermore, the signal SEL becomes high at the time T626. An averaged voltage signal of the first reset cancellation signal held in the second memory capacity 511 and the second reset cancellation signal held in the third memory capacity 518 is subjected to A/D conversion by the A/D conversion circuit 516 included in the column circuit 515.

The signal PTS becomes high at a time T627, which is different for each row, and furthermore, the signal SEL becomes high at a time T628. An averaged voltage signal of the voltage signal corresponding to the first accumulation period EXP1 and held in the first memory capacity 510 and the voltage signal corresponding to the second accumulation period EXP2 and held in the third memory capacity 518 is subjected to A/D conversion by the A/D conversion circuit 516 included in the column circuit 515.

The pixel signal on which the A/D conversion has been performed is subjected to the publicly-known CDS operation in the signal processing circuit 106. In this manner, according to the present exemplary embodiment, the imaging apparatus that has an extended wide dynamic range can be provided based on the premise of performing the CDS operation without increasing data per frame output from the imaging apparatus.

Figure 7:
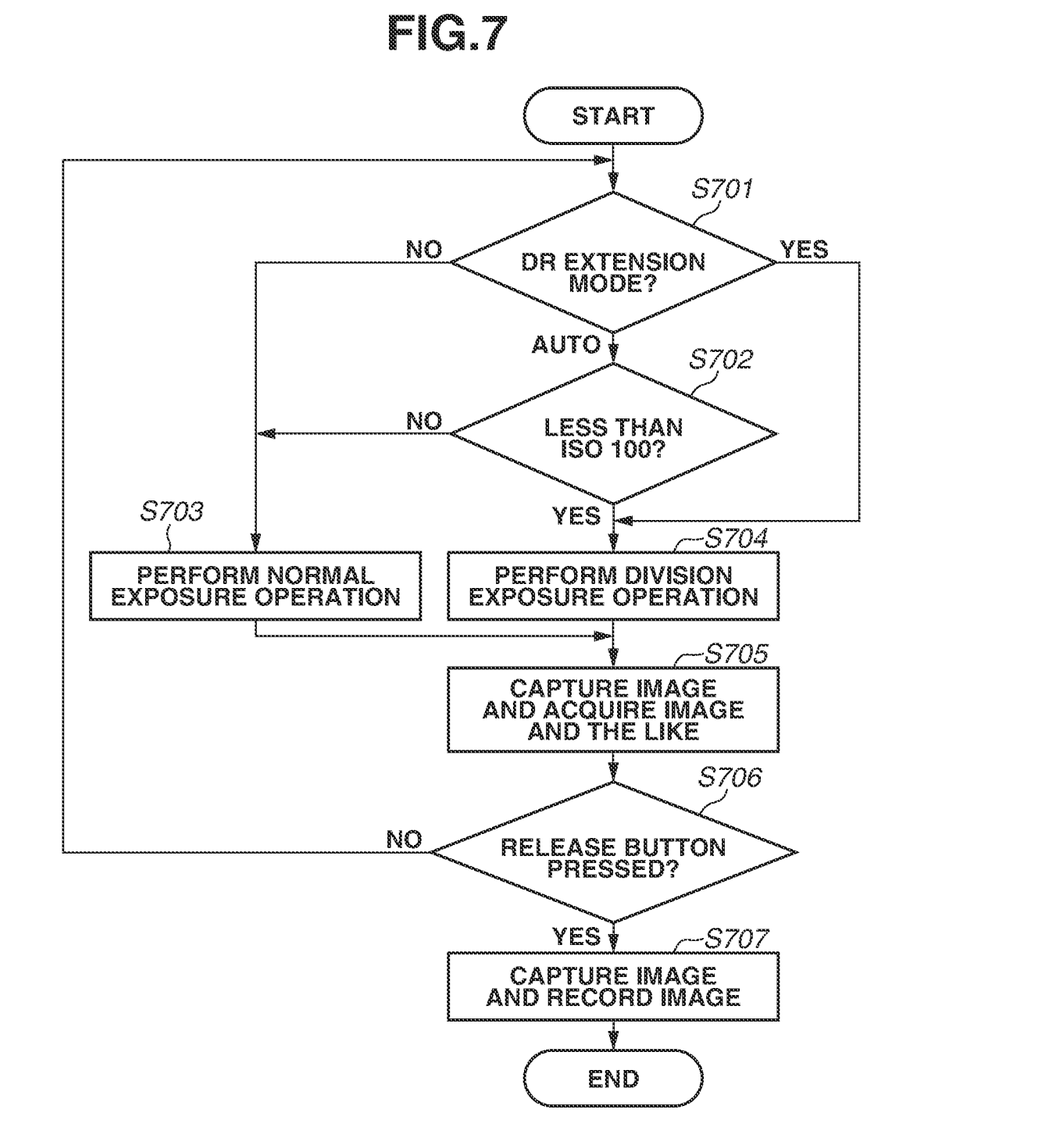
FIG. 7 is a flowchart for switching of a dynamic range extension operation according to a third exemplary embodiment.

In a third exemplary embodiment, control for switching a dynamic range extension operation in the imaging system illustrated in FIG. 1 is to be described. In the present exemplary embodiment, as an example, a case is to be described where minimum International Organization for Standardization (ISO) sensitivity that can be implemented by the image pickup element 105 in a normal exposure operation is 100. FIG. 7 is a flowchart for performing control for switching the dynamic range extension operation.

In step S701, after the imaging system is powered ON, the imaging system checks whether a dynamic range extension mode (hereinafter referred to as DR extension mode) is set.

In a case where the DR extension mode is not set (NO in step S701), the processing proceeds to step S703. In step S703, the normal exposure operation, in which one frame accumulation time is not divided into a plurality of periods of time, is set.

In a case where the DR extension mode is set (YES in step S701), the processing proceeds to step S704. In step S704, the imaging system performs a division exposure operation for dividing one frame accumulation time into the plurality of periods of time, which has been described in the first and second exemplary embodiments.

In a case where an AUTO mode for automatically shifting to the DR extension mode is set (AUTO in step S701), the processing proceeds to step S702. In step S702, the imaging system checks currently set ISO sensitivity.

In a case where the currently set ISO sensitivity is 100 or greater (NO in step S702), the processing proceeds to step S703. In step S703, the imaging system performs the normal exposure operation by which one frame accumulation time is not divided into the plurality of periods of time.

In a case where the currently set ISO sensitivity is less than 100 (YES in step S702), the processing proceeds to step S704. In step S704, the imaging system performs the division exposure operation for diving one frame accumulation time into the plurality of periods of time, which has been described in the first and second exemplary embodiments. This operation is performed because the ISO sensitivity of less than 100 cannot be implemented due to a saturation signal amount of the image pickup element 105 in the normal exposure operation. The division exposure operation is executed to extend a dynamic range that is determined by a saturation capacity of the photodiode and implements ISO sensitivity of less than 100.

In step S705, in a case where the normal exposure operation is performed in step S703 or the division exposure operation is performed in step S704, live-view image-capturing is started.

In step S706, the imaging system determines whether the release button is pressed. In a case where the release button is pressed (YES in step S706), the processing proceeds to step S707. In step S707, the imaging system captures an image to be recorded. After performing predetermined signal processing in the signal processing circuit 106, the imaging system temporarily stores the image in a memory unit or circuit 107, records the image in the recording medium 110 through the I/F circuit 109, and ends the processing. In a case where the release button is not pressed (NO in step S706), the processing returns to step S701. In step S701, the imaging system repeats a series of operations.

The above-mentioned control can extend the dynamic range of the image pickup element, and can extend the minimum ISO sensitivity that can be set in the camera without decreasing frame speed. Also in a case where the minimum ISO sensitivity is not to be extended, it is possible to increase the saturation signal amount without decreasing the frame speed.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2021-190619, filed Nov. 24, 2021, and No. 2022-113923, filed Jul. 15, 2022, which are hereby incorporated by reference herein in their entirety.

What is claimed is:

1. An imaging apparatus comprising:
   a plurality of pixels, each of which includes a photoelectric conversion circuit and a charge/voltage conversion circuit configured to convert charges generated by the photoelectric conversion circuit into a voltage signal; and
   a plurality of memories, each of which is arranged so as to correspond to each pixel on a one-to-one basis and includes a plurality of voltage holding circuits each configured to hold the voltage signal output from each pixel,
   wherein the plurality of voltage holding circuits hold respective voltage signals in different accumulation periods in each pixel and the plurality of voltage holding circuits are connected in parallel, whereby the voltage signals in the different accumulation periods in each pixel are averaged.

2. The imaging apparatus according to claim 1, wherein the different accumulation periods are accumulation periods that are obtained by performing time-division on one frame.

3. The imaging apparatus according to claim 1, further comprising a plurality of analog/digital (A/D) conversion circuits configured to perform A/D conversion on the averaged voltage signal.

4. The imaging apparatus according to claim 1, wherein each of the voltage holding circuits further holds a corresponding one of a plurality of reset cancellation signals in each pixel and the voltage holding circuits are connected in parallel, whereby the voltage signals in the different accumulation periods are averaged into the averaged voltage signal.

5. The imaging apparatus according to claim 4, wherein the different accumulation periods are accumulation periods that are obtained by performing time-division on one frame.

6. The imaging apparatus, according to claim 4, further comprising a plurality of A/D conversion circuits configured to perform A/D conversion on the averaged voltage signal.

* * * * *